March 10, 1959 C. F. WEST ET AL 2,876,610
TOBACCO HARVESTER
Filed Jan. 22, 1957 14 Sheets-Sheet 1

Inventors
CLIFTON F. WEST
WILLIAM F. RHEM
JESSE B. WETHINGTON
BY
Stone, Boyden Mack, ATTORNEYS March 10, 1959　　C. F. WEST ET AL　　2,876,610
TOBACCO HARVESTER Filed Jan. 22, 1957　　14 Sheets-Sheet 2

INVENTORS
CLIFTON F. WEST,
WILLIAM F. RHEM,
JESSE B. WETHINGTON
BY *Stone, Boyden & Mack,*
ATTORNEYS March 10, 1959

C. F. WEST ET AL 2,876,610

TOBACCO HARVESTER

Filed Jan. 22, 1957

INVENTORS
CLIFTON F. WEST,
WILLIAM F. RHEM,
JESSE B. WETHINGTON,
BY Stone, Boyden & Mack,
ATTORNEYS March 10, 1959  C. F. WEST ET AL  2,876,610
TOBACCO HARVESTER
Filed Jan. 22, 1957  14 Sheets-Sheet 4
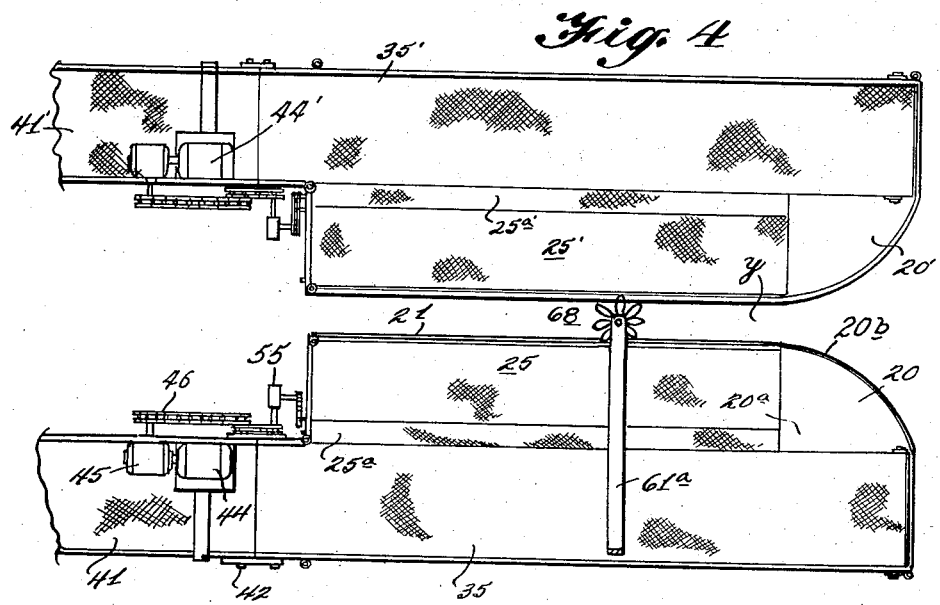
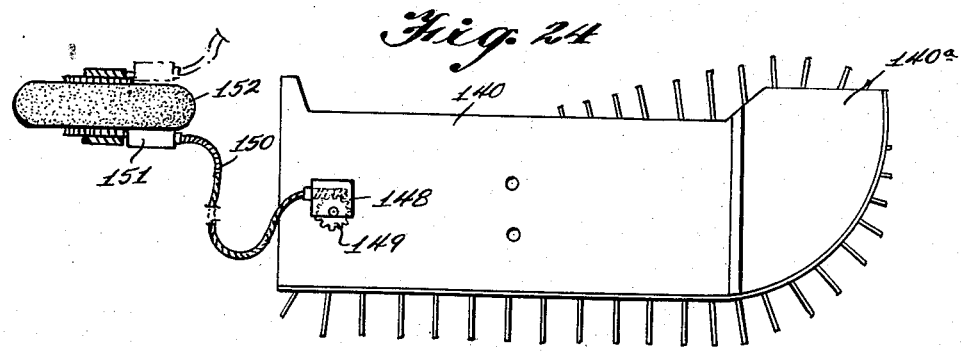
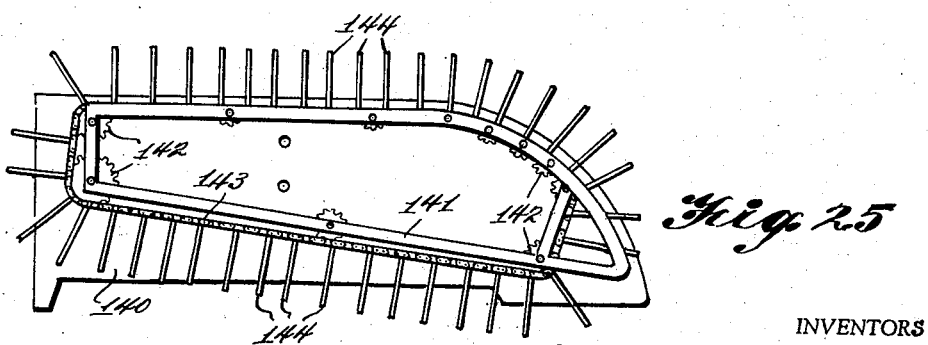
INVENTORS
CLIFTON F. WEST
WILLIAM F. RHEM
JESSE B. WETHINGTON
BY Stone, Boyden & Mack,
ATTORNEYS March 10, 1959

C. F. WEST ET AL 2,876,610

TOBACCO HARVESTER

Filed Jan. 22, 1957

INVENTORS
CLIFTON F. WEST
WILLIAM F. RHEM
JESSE B. WETHINGTON

BY Stone, Boyden & Mack,

ATTORNEYS.

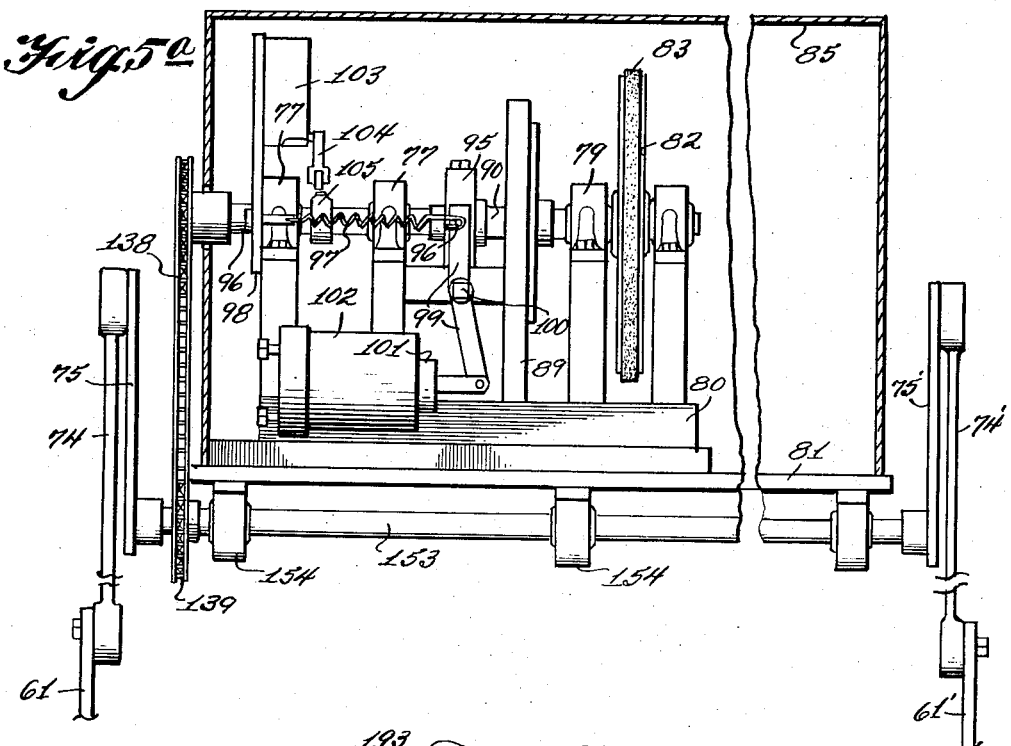
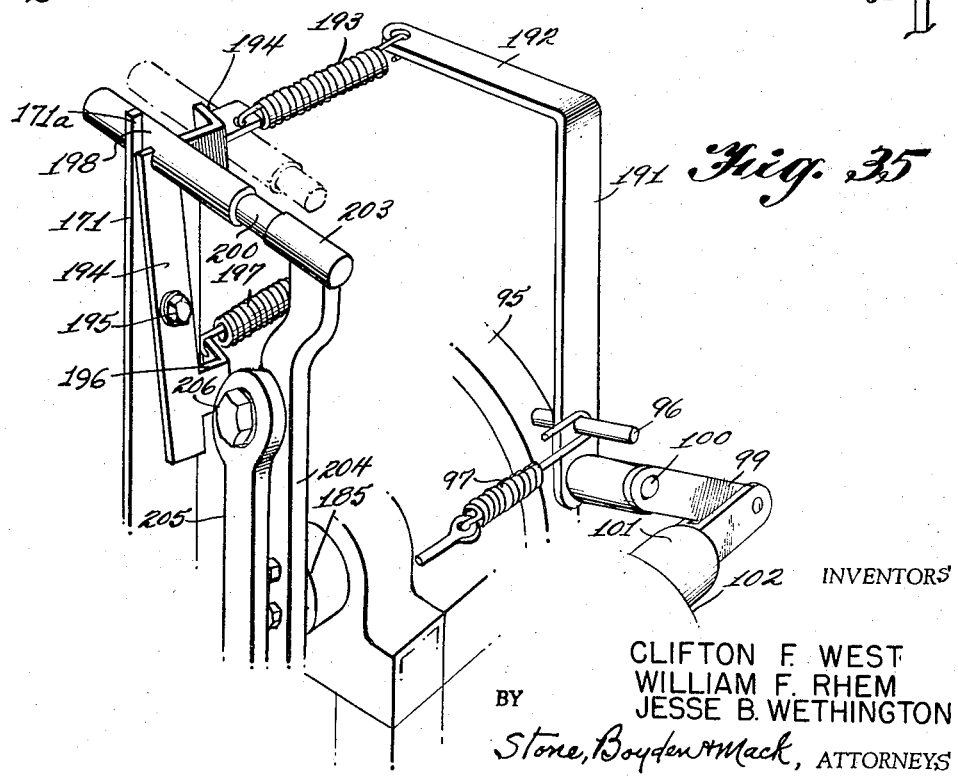

March 10, 1959

C. F. WEST ET AL 2,876,610

TOBACCO HARVESTER

Filed Jan. 22, 1957

INVENTORS
CLIFTON F. WEST,
WILLIAM F. RHEM,
JESSE B. WETHINGTON,
BY Stone, Boyden & Mack,
ATTORNEYS

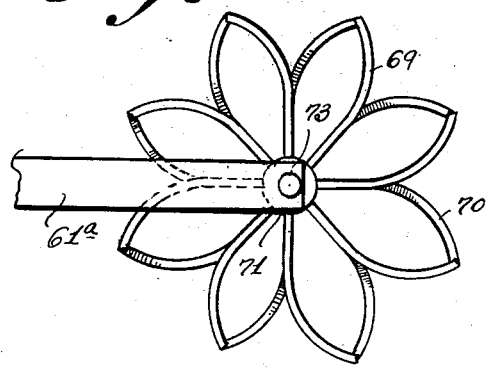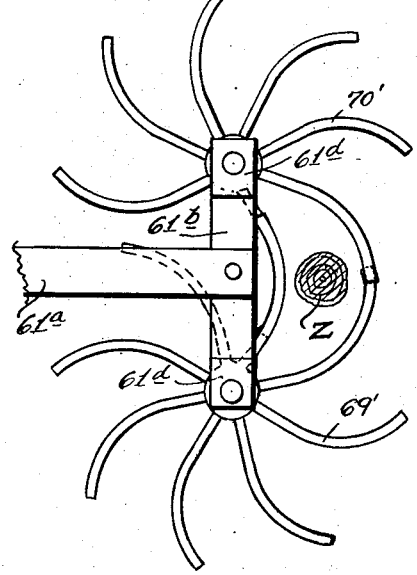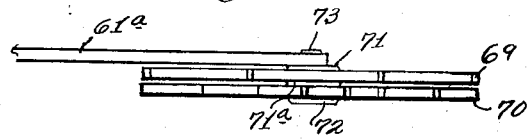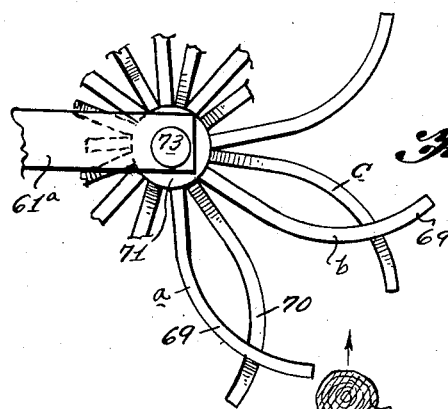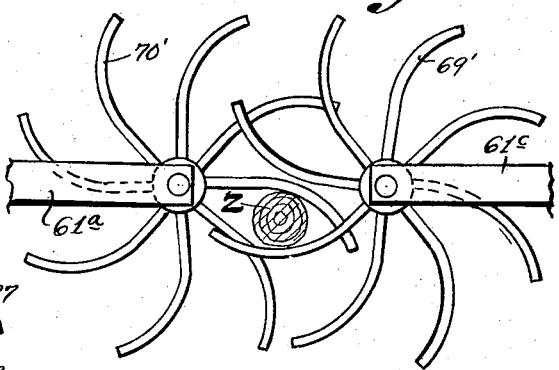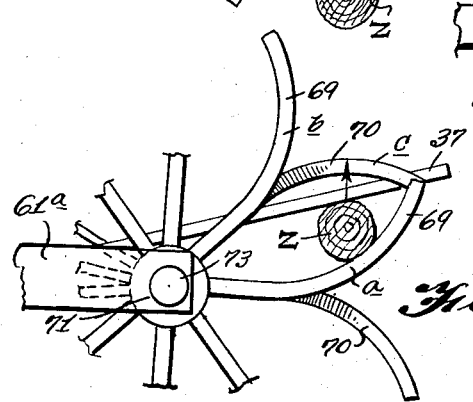

March 10, 1959 C. F. WEST ET AL 2,876,610
TOBACCO HARVESTER
Filed Jan. 22, 1957 14 Sheets-Sheet 9

INVENTORS
CLIFTON F. WEST,
WILLIAM F. RHEM,
JESSE B. WETHINGTON
BY Stone, Boyden & Mack,
ATTORNEYS March 10, 1959  C. F. WEST ET AL  2,876,610
TOBACCO HARVESTER
Filed Jan. 22, 1957  14 Sheets-Sheet 10
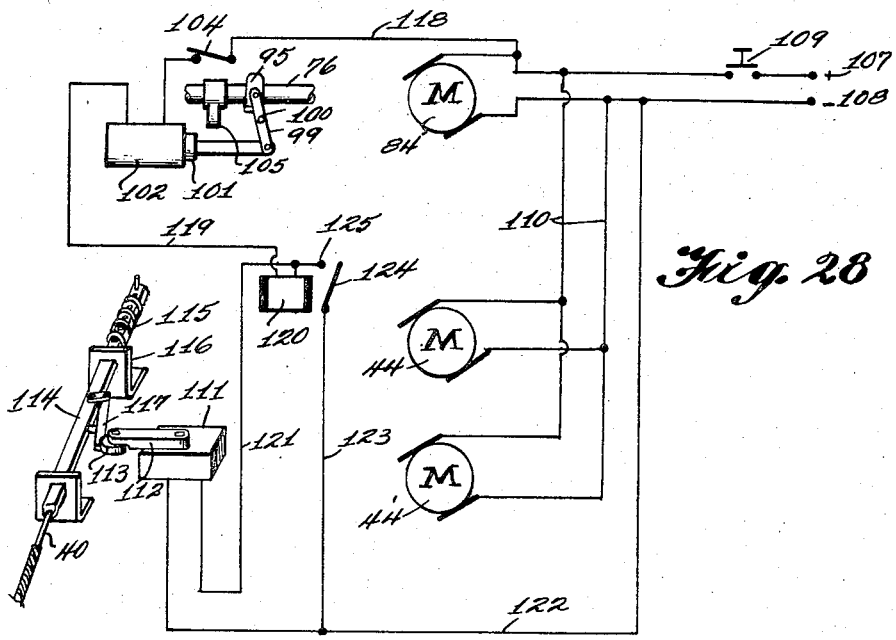
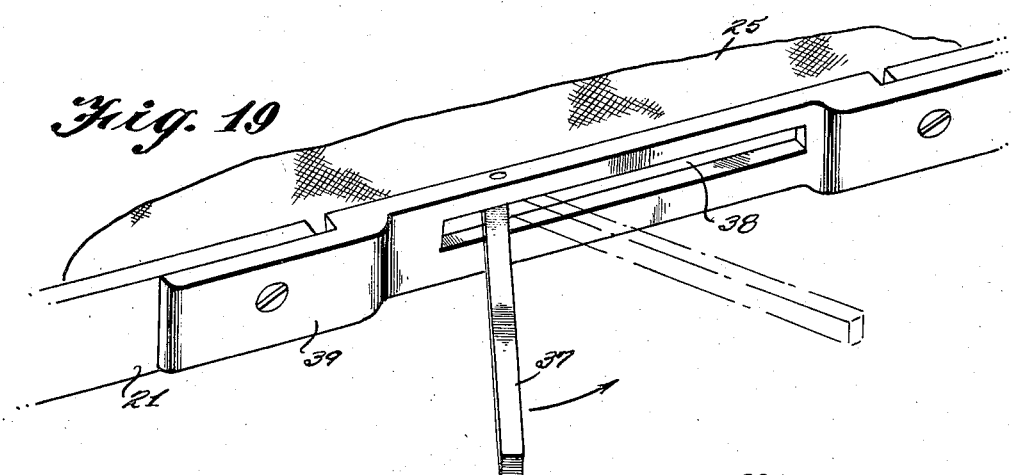
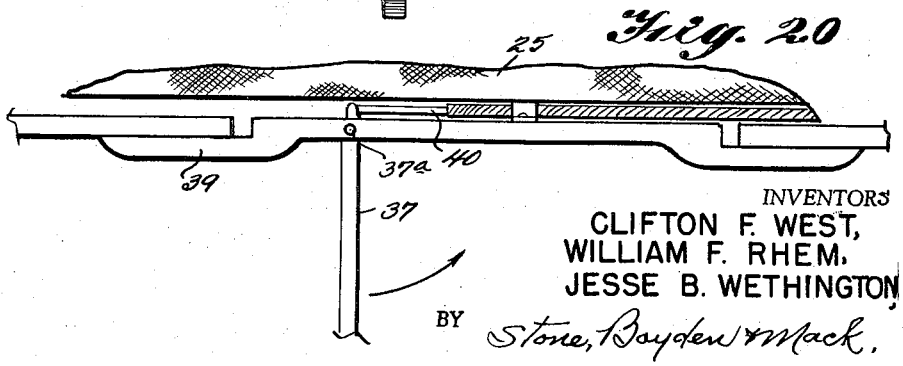
INVENTORS
CLIFTON F. WEST,
WILLIAM F. RHEM,
JESSE B. WETHINGTON
BY Stone, Boyden & Mack,
ATTORNEYS

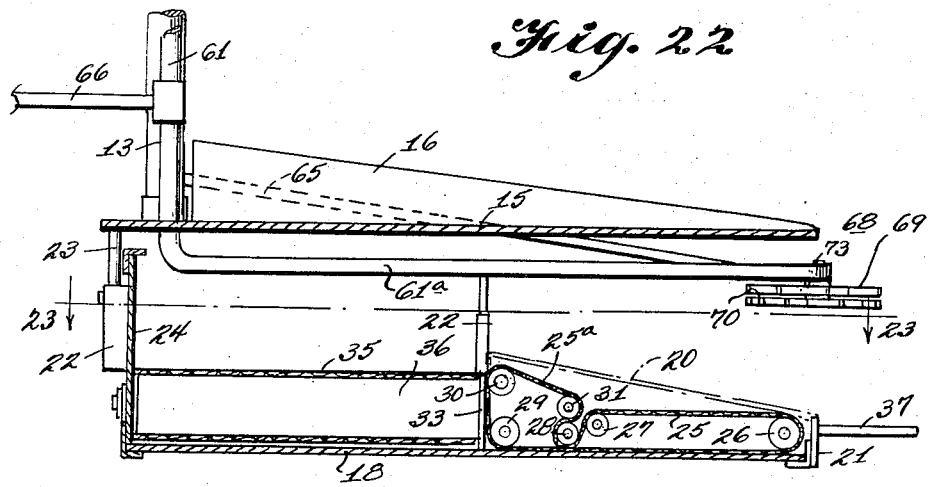
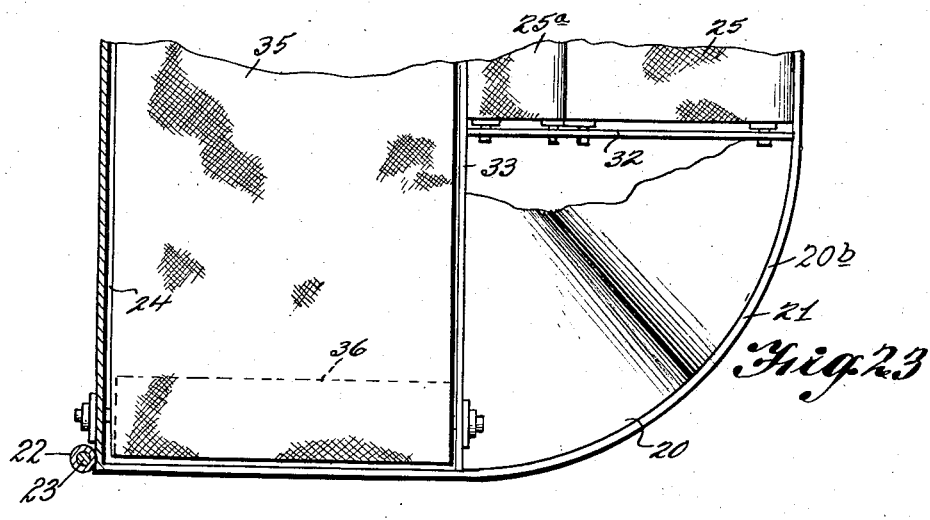
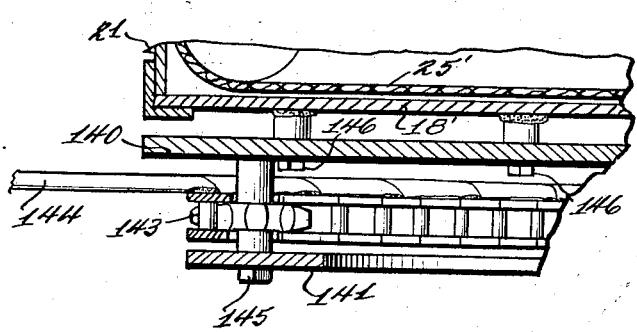
INVENTORS
CLIFTON F. WEST,
WILLIAM F. RHEM,
JESSE B. WETHINGTON,
BY Stone, Boyden & Mack.
ATTORNEYS

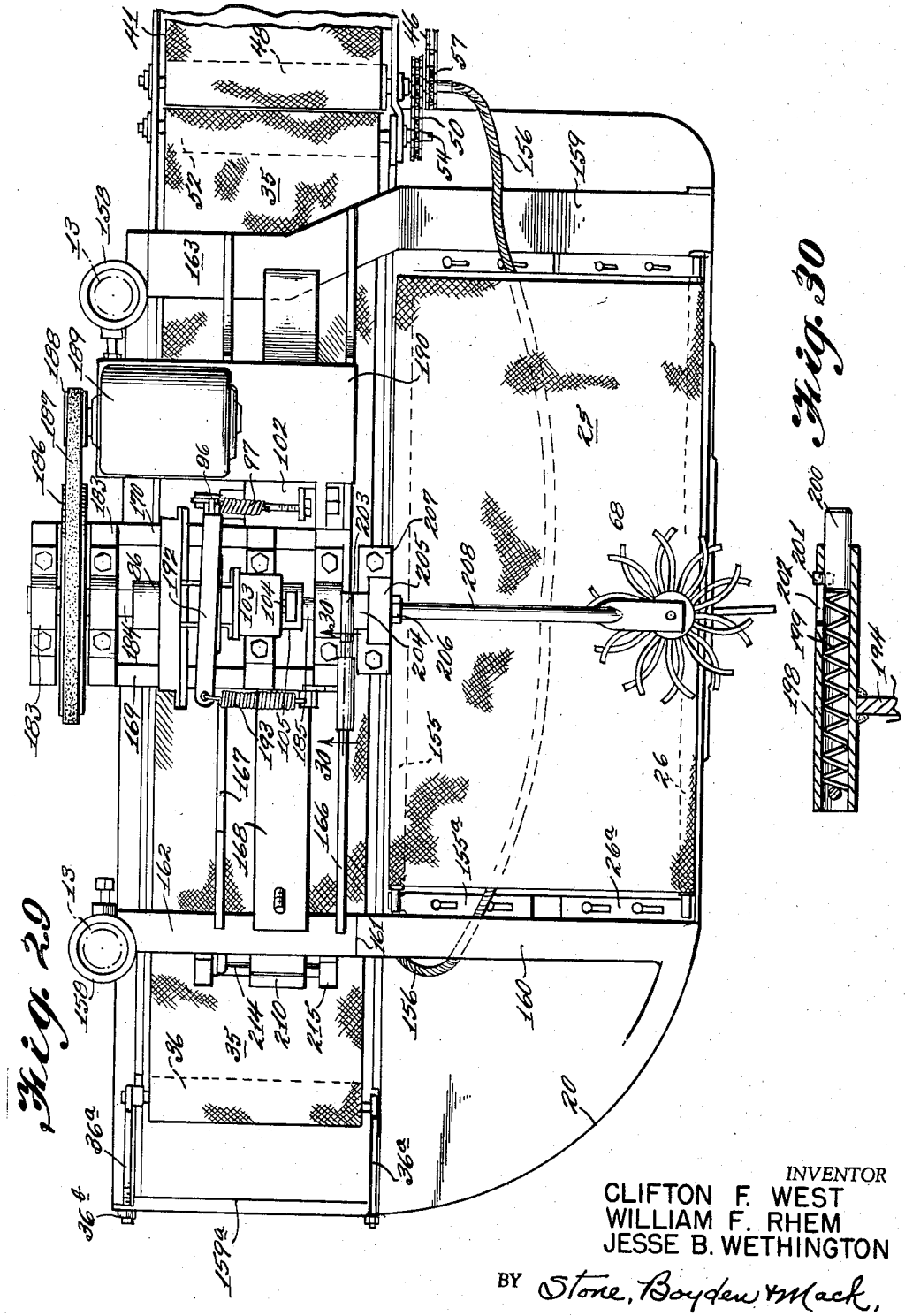

March 10, 1959 C. F. WEST ET AL 2,876,610
TOBACCO HARVESTER
Filed Jan. 22, 1957 14 Sheets-Sheet 13
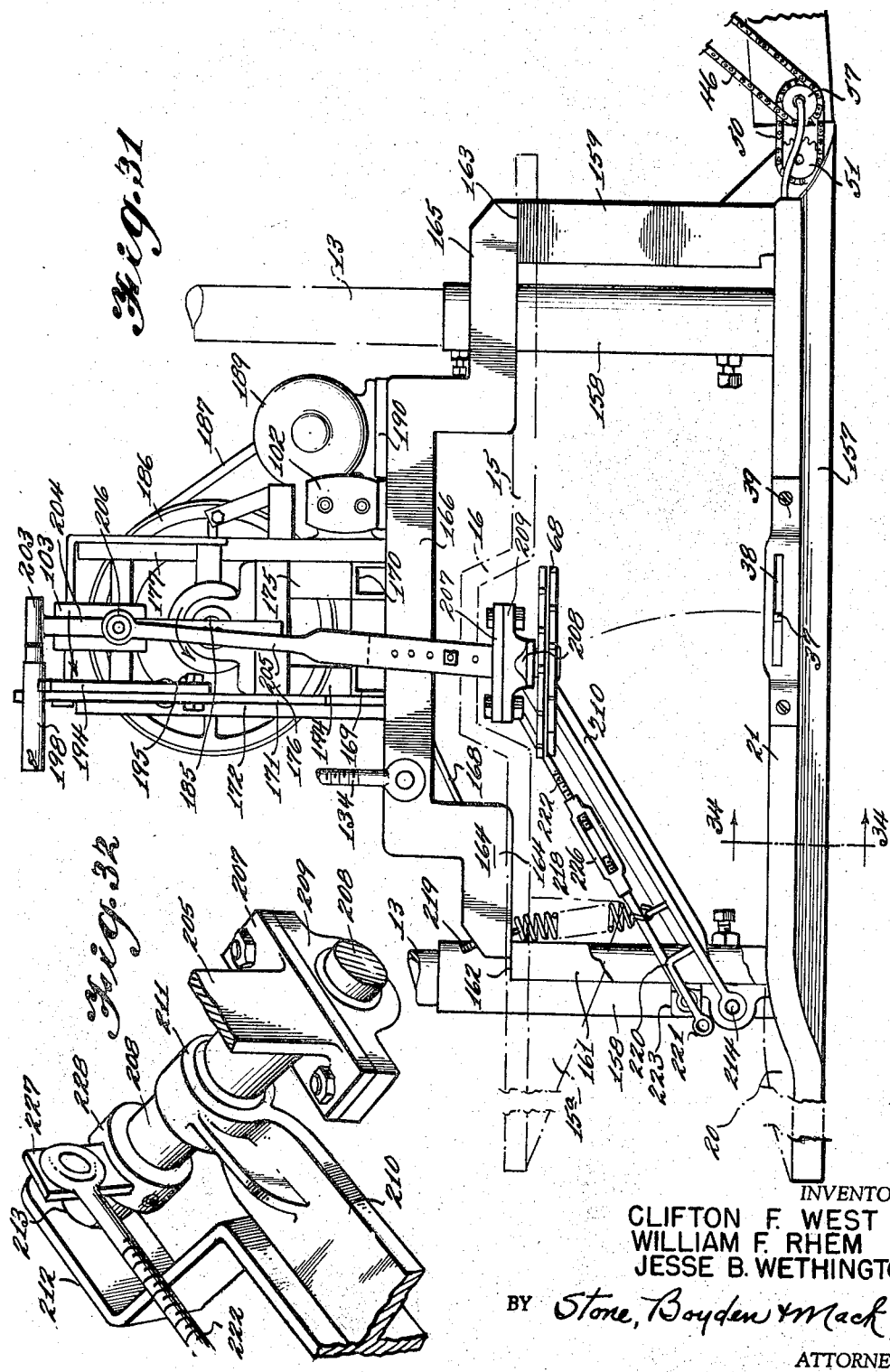
INVENTORS
CLIFTON F. WEST
WILLIAM F. RHEM
JESSE B. WETHINGTON
BY Stone, Boyden & Mack
ATTORNEYS March 10, 1959

C. F. WEST ET AL 2,876,610

TOBACCO HARVESTER

Filed Jan. 22, 1957

INVENTORS
CLIFTON F. WEST
WILLIAM F. RHEM
JESSE B. WETHINGTON

BY Stone, Boyden & Mack,

ATTORNEYS

United States Patent Office 2,876,610
Patented Mar. 10, 1959

2,876,610

TOBACCO HARVESTER

Clifton F. West, William F. Rhem, and Jesse B. Wethington, Kinston, N. C.

Application January 22, 1957, Serial No. 635,481

14 Claims. (Cl. 56—27.5)

This invention relates to tobacco harvesting machines, and more particularly to a machine for stripping the leaves from the stalks of tobacco plants standing in the field.

One object of the invention is to devise a machine having improved stripping means so constructed and arranged as to completely surround each successive stalk in a row at a predetermined height from the ground as the machine moves along, together with means for suddenly moving such stripping means downwardly after each stalk has been so surrounded.

Another object is to provide conveyer means on each side of the row for receiving and carrying away the leaves removed from the stalks by said stripping means.

Still another object of the invention is to devise means for first moving the stripping means downwardly to strip the leaves from a stalk which has been surrounded, and then immediately moving said stripping means upwardly to its starting position, so as to be ready to operate on the next stalk.

Yet a further object is to provide means for moving the stripping means downwardly through a predetermined distance from a definite starting point, and for varying as desired the height of such starting point from the ground, so that the machine can be set to remove from the stalks only the lower leaves at the first harvesting or "priming" operation, or the leaves progressively higher up on the stalks at successive subsequent operations.

A still further object of the invention is to devise means for laterally supporting the stalks to prevent them from being bent or broken by the stripping means when such stripping means is set to operate on the upper portions of the stalks.

With the above and other objects in view, and to improve generally on the details of such machines, the invention consists in the construction, combination and arrangement of parts hereinafter described and claimed, and illustrated by way of example in the accompanying drawings, forming part of this specification, and in which:

Fig. 4 is a fragmentary plan view of the conveyer belts used to receive and carry away the tobacco leaves.

Fig. 5a is a similar view showing a slightly modified form of mechanism for use in connection with the stripping means shown in Figs. 14 and 15.

Fig. 9 is an enlarged plan view of one form of our improved stripping means.

Fig. 10 is a side elevation thereof.

Figs. 11 and 12 are fragmentary plan views thereof showing the parts in different positions.

Figs. 13 to 17, inclusive, are plan views showing various modified forms of striping means.

Figure 17:
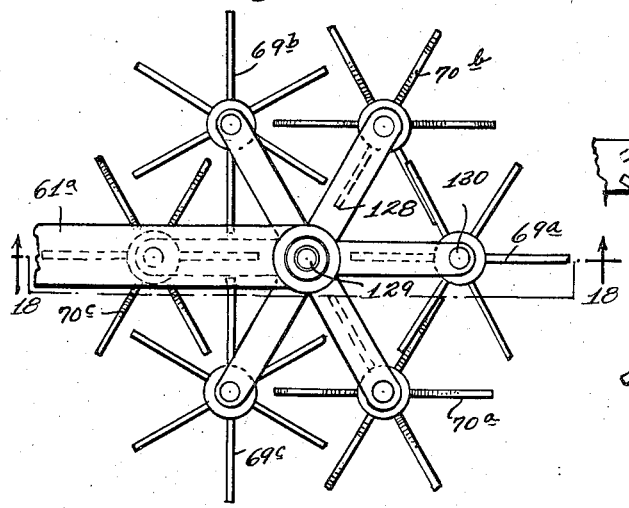
Figure 18:
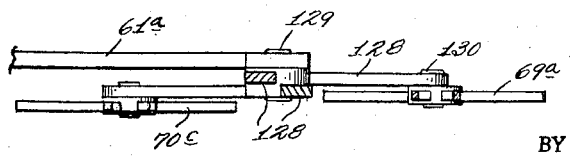

Fig. 18 is a vertical section substantially on the line 18—18 of Fig. 17.

Fig. 19 is a fragmentary perspective view on a large scale showing the trip-arm for initiating the operation of the stripping means.

Fig. 20 is a plan view thereof on a reduced scale.

Figures 3, 21:
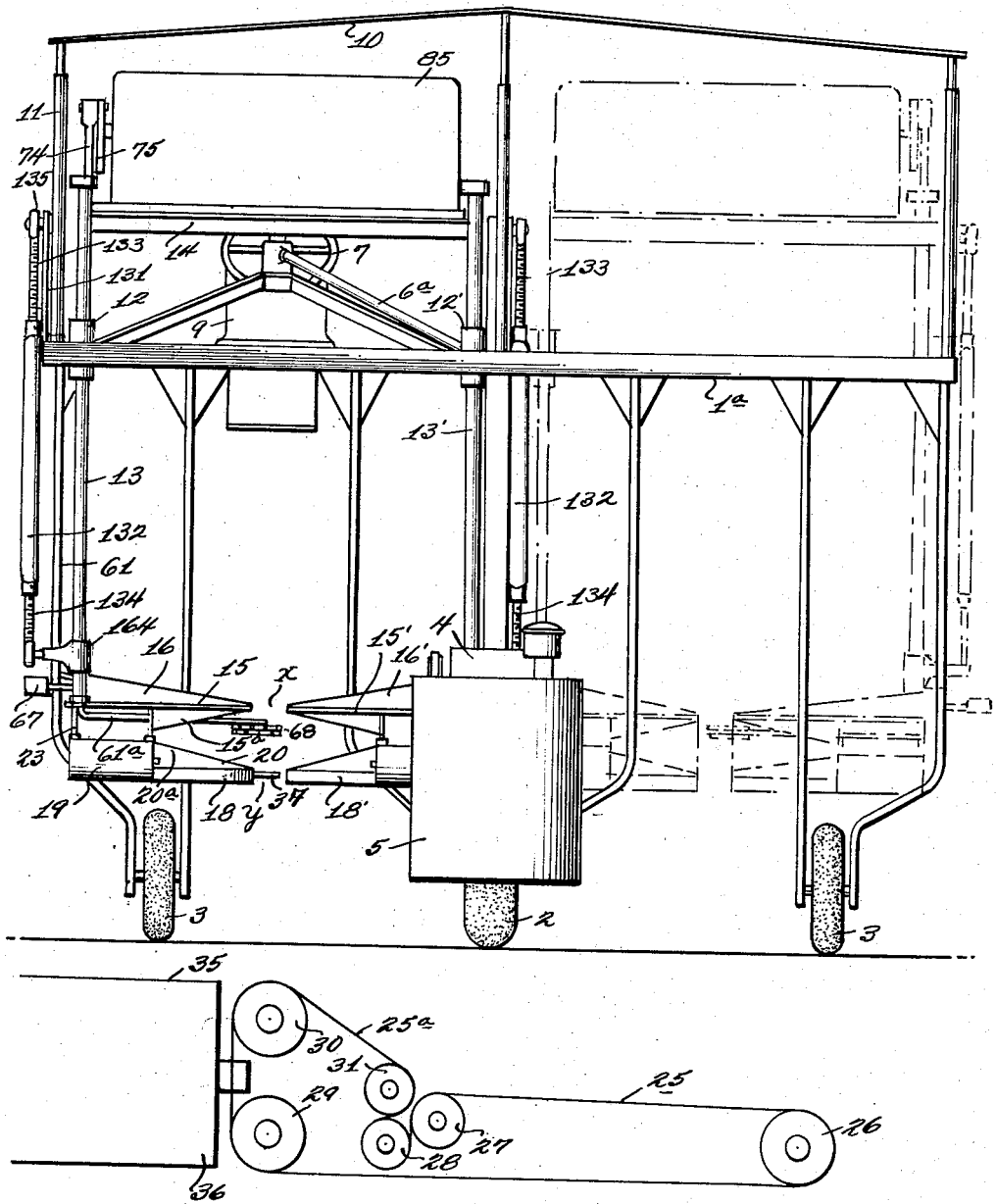
Fig. 3 is a front elevation thereof, parts being shown in broken lines.

Fig. 21 is a diagrammatic view showing our transversely moving conveyer belt for receiving the leaves stripped from the stalk.

Fig. 22 is a transverse vertical section through a portion of the forward part of the machine, the trip-arm and stripping means being shown in elevation, and the position of the conveyer belts being illustrated.

Fig. 23 is a fragmentary sectional plan substantially on the line 23—23 of Fig. 22, parts being broken away.

Fig. 24 is a plan view showing our improved means for supporting the tobacco stalks when they are engaged by the stripping means.

Fig. 25 is an inverted plan view thereof.

Fig. 26 is a fragmentary elevational view, with parts broken away and shown in section, on an enlarged scale showing how our improved stalk supporting means is mounted.

Fig. 27 is a perspective view showing the arm supporting our improved stripping means.

Fig. 28 is a diagram showing the electrical circuits employed in carrying out the invention.

Fig. 29 is a plan view of a modified construction of stripping mechanism.

Fig. 30 is an enlarged detail in vertical section, taken substantially on the line 30—30 of Fig. 29.

Fig. 31 is a side elevation of the mechanism shown in Fig. 29.

Fig. 32 is a fragmentary perspective view on an enlarged scale showing a portion of the mechanism illustrated in Fig. 31.

Figure 33:
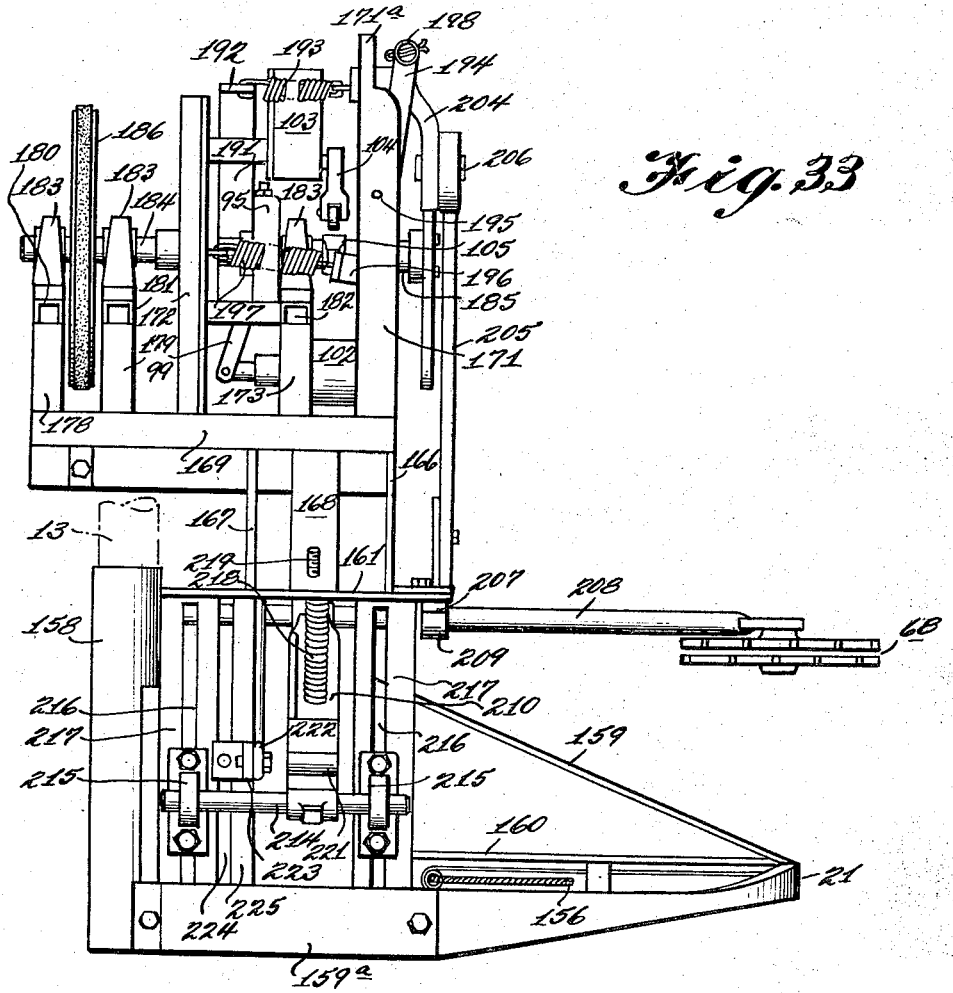

Fig. 33 is an elevation of the mechanism shown in Fig. 31.

Figure 34:
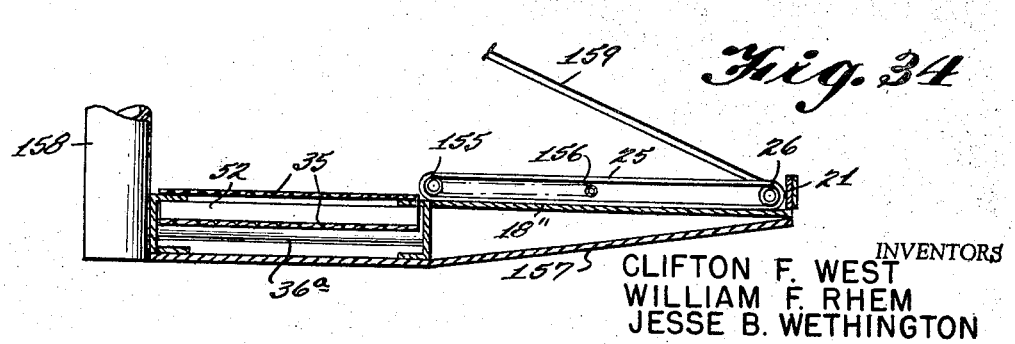

Fig. 34 is a transverse section taken substantially on the line 34—34 of Fig. 31; and Fig. 35 is a fragmentary perspective showing some of the mechanism illustrated in the upper portion of Fig. 31, parts being omitted.

Figure 1:
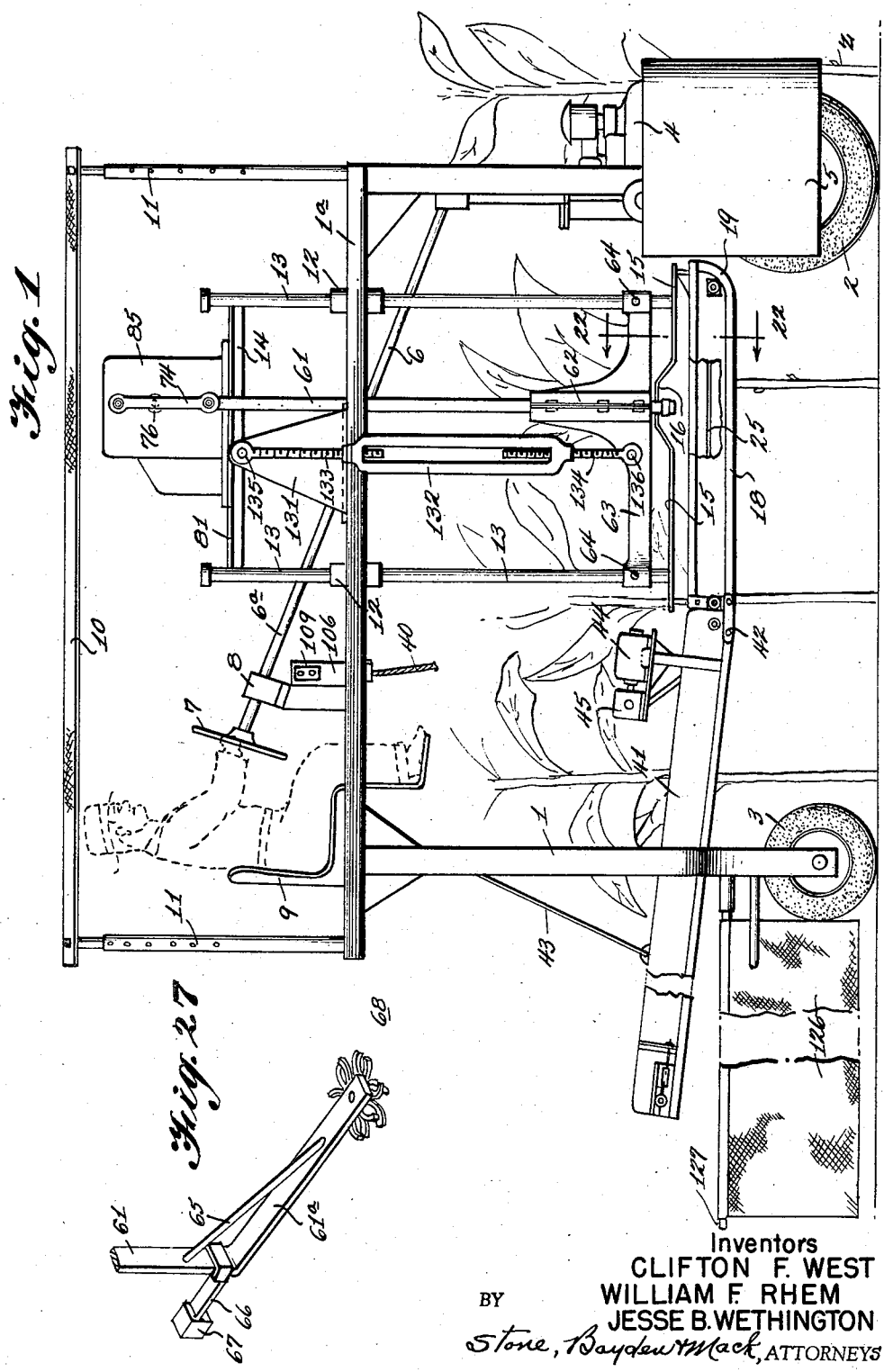
Fig. 1 is a side elevation of a tobacco harvesting machine embodying the invention, and showing one form of mechanism for operating the leaf stripping means, parts being broken away.
Figure 2:
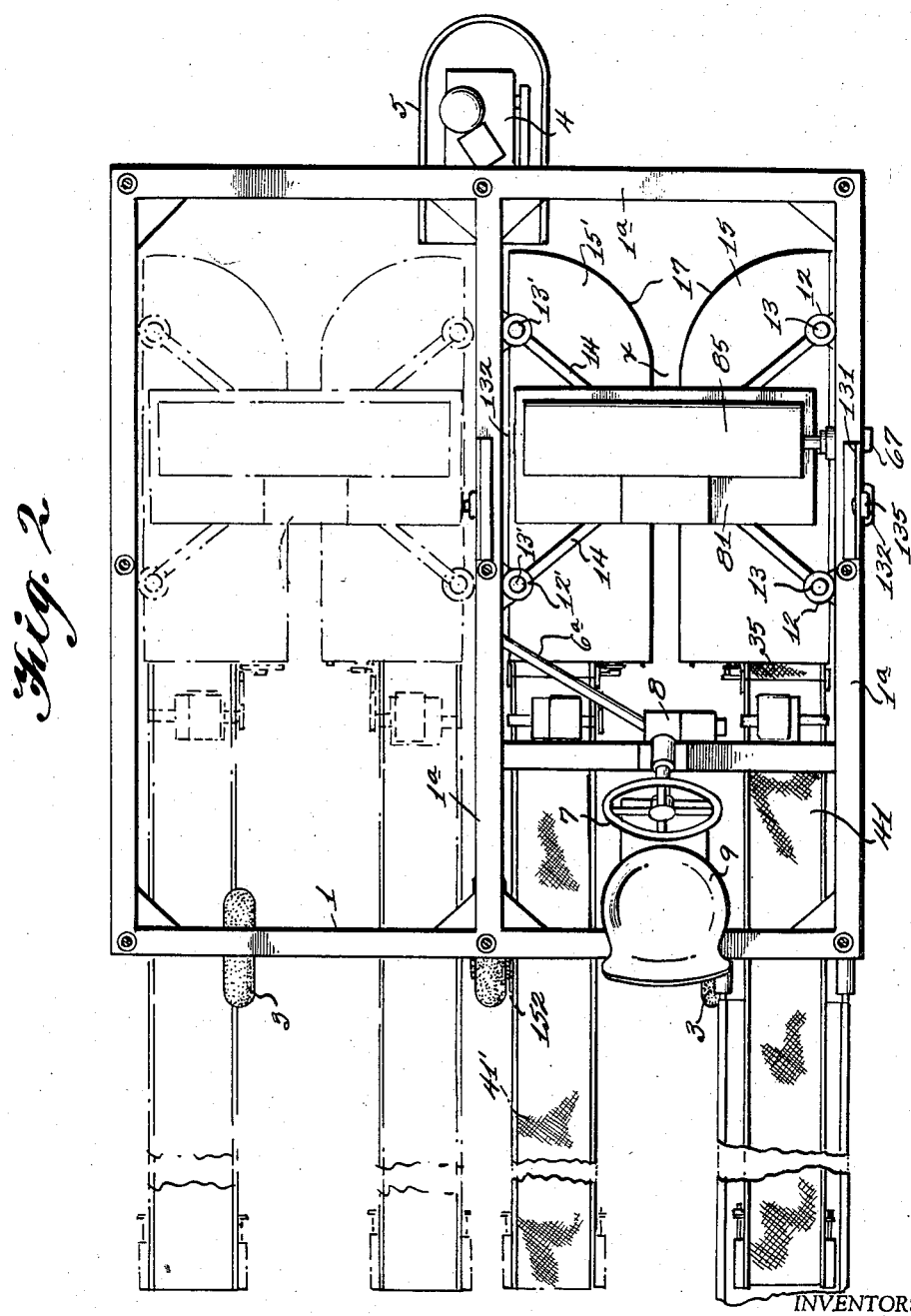
Fig. 2 is a plan view thereof, parts being shown in broken lines.

Referring to the drawings in detail, and more particularly first to Figs. 1, 2 and 3 thereof, our improved machine comprises a suitable frame, shown as consisting of uprights 1 and horizontal members 1ª, this frame being supported at its front end on a single central driving wheel 2 and at its rear on a pair of spaced wheels 3. The front wheel 2 is driven by a suitable motor 4 enclosed in a housing 5, and this driving wheel and motor may be substantially similar to that shown in Patent Number 2,704,158 to Long.

As in the Long patent this driving wheel 2 is mounted to swing on a vertical axis, and is steered by means of a steering shaft made up of two sections 6 and 6ª, having at its rear end a steering wheel 7. A gear box 8 transmits the motion of the steering wheel 7 to the upper section of the steering shaft.

Near the steering wheel 7 is an operator's seat 9, and over his head is preferably provided a canopy 10 adjustably supported on posts 11.

Set into the side frame members 1ª are a pair of spaced guide sleeves 12, and through these sleeves a pair of vertical rods 13 are mounted to slide. A similar pair of guide sleeves 12' is set into the horizontal frame at a point near the center of the machine and through these sleeves slide a pair of vertical rods 13'. Thus, there are provided two pairs of vertical rods, one near the outside and one near the center of the machine, these vertical rods being rigidly tied together near their upper ends by cross braces 14 as shown in Figs. 1, 2 and 3.

It may be explained at this point that in Figs. 2 and 3 we have shown a frame arranged to harvest two rows of tobacco at the same time, the driving wheel being positioned between these two rows. Such an arrangement has its practical advantages and would probably be used in practice. However, we have illustrated in detail and will describe only the mechanism located at one side of the machine, it being understood that identical mechanism can, if desired, be duplicated on the other side of the machine as illustrated in broken lines in Figs. 2 and 3. While, therefore, the invention is illustrated as capable of embodiment in a two-row machine, it is by no means limited to such an arrangement.

By reference to Figs. 1, 2 and 3 it will be seen that we provide a pair of upper plates or platforms 15 and 15' projecting inwardly from the outside and center of the machine, the adjacent edges being spaced apart to provide a slot x between them. Similarly, below these platforms 15 and 15' and in vertical registry therewith are provided a pair of lower plates or platforms 18 and 18', the adjacent edges of which are spaced apart to provide a slot y immediately below the slot x. It will therefore be understood that as the machine travels along a row, the tobacco stalks pass along through the vertically alined slots x and y. The plates 15 and 15' are formed with a transversely extending ridge or hump 16 and 16', having a purpose hereinafter described, and the front edges of both pairs of plates 15, 15' and 18, 18' are rounded as shown at 17 in Fig. 2 to guide the tobacco stalks into the slot between them. The plates 15 and 15' are preferably mounted on posts 23 adjustably set into sockets 22 secured to plates 24 forming part of the conveyer housing, so that they may be raised and lowered, as best shown in Fig. 22.

On either side of the slots x and y are disposed conveyer means. These conveyer means comprise a transversely moving endless conveyer adjacent the slot and a longitudinally moving endless conveyer on the side remote from the slot. The position of these two conveyers is well illustrated in Figs. 4, 7 and 22 and 23, and the detailed arrangement of pulleys for supporting the transversely moving conveyer is also clearly illustrated in Fig. 21.

Referring to these figures, the transversely moving endless conveyer is shown as consisting of two sections 25 and 25ª, the first section being substantially horizontal while the second or auxiliary section is inclined upwardly so as to deliver onto the adjacent longitudinally travelling conveyer belt 35. The conveyer belt 25 is shown as passing around a pulley 26 adjacent the slot and then around pulleys 27, 28, 29, 30 and 31 as shown in Figs. 21 and 22. The longitudinally traveling conveyer 35 passes around rollers 36 journalled at one end in the plate 24 and other end in a plate 33 that divides the two conveyer chambers. The rollers carrying the transversely travelling belt 25 are journalled in a front plate 32, as shown in Fig. 23, and in a similar rear plate (not shown).

Referring again to Figs. 22 and 23, as well as Fig. 4, it will be seen that forward of the transverse conveyer 25 is a sloping plate 20 having a curved edge 20b, and around this curved edge preferably extends an angle-shaped binding strip 21. The purpose of the sloping plate 20 which rises to an apex at 20ª will be hereinafter described. The plate 18 is shown as extending entirely across the conveyer system underneath the same and constitutes a pan to protect the conveyers from contact with the ground.

In order to actuate the stripping mechanism hereinafter described, we provide a trip arm 37 pivotally mounted near its inner end at 37ª in a plate 39 shown as secured to the strip 21 at a point near the pan 18 and near the edge of the conveyer 25. The arm 37 works through a slot 38 in the plate 39, and is connected at its inner end with one end of a Bowden wire 40. This Bowden wire 40 extends up to a switch mechanism indicated at 106 in Fig. 1 and also shown in detail in Fig. 28.

The longitudinally travelling conveyer 35 extends rearwardly to a point 42 (see Fig. 1), at which point is pivoted one end of another endless conveyer 41 forming in effect a continuation of the conveyer 35. This conveyer 41 is angularly adjustable about the pivot 42 and is held in adjusted position by a brase or the like 43. While the conveyers 25, 35 and 41 might be driven by suitable transmission mechanism from the main motor 4, we find it simpler and more desirable to drive them by electric motors supplied with current from a suitable storage battery (not shown). Therefore, in Figs. 1 and 4 we have shown an electric motor 44 connected to a speed reducing transmission 45, and on the shaft of this transmission is mounted a sprocket wheel which drives through a sprocket chain 46, another sprocket wheel 47 on the shaft 48ª of a roller 48 about which the conveyer 41 passes, as clearly shown in Fig. 7. Another sprocket 49 is also secured to this shaft, and around this sprocket 49 and a sprocket wheel 51 passes another sprocket chain 50. This sprocket chain 50 also preferably passes around an idler 53. The sprocket wheel 51 is secured to the shaft 54 of a roller 52 around which passes the conveyer belt 35. The shaft 54 extends into a gear box 55, from which extends a shaft 56 carrying at its end a sprocket wheel 57. Around this sprocket wheel passes a sprocket chain 58 driving a smaller sprocket wheel 59 on the end of a shaft 60 projecting from the roller 28 which, as also clearly shown in Figs. 21 and 22, is one of the rollers that drives the conveyer belt 25. Thus all three conveyer belts 25, 35 and 41 are driven from the single motor 44.

It will be understood that while we have described only the conveyers 25, 35, 41 and their associated parts, there is provided on the other side of the slots x and y a similar set of conveyer belts 25', 35' and 41' driven by a separate motor 44' through chains and sprockets similar to those above described. Thus, one motor drives the mechanism at one side of the slots and another motor drives the mechanism at the other side of the slots, these two motors being indicated at 44 and 44' in Fig. 28. Similarly, there is a sloping plate 20' on the other side of the slots, corresponding to the plate 20 above described.

Referring now more particularly to Figs. 1, 3, 5 and 27, we provide a vertical bar 61 slidably mounted in a guideway 62 carried by a frame 63 rigidly secured at 64 to the posts or rods 13. This vertically disposed bar 61 is bent at right angles at its lower end to form a horizontally extending arm 61ª braced by a diagonally extending rod 65 and carrying at its free end our improved stripping means designated in its entirety by the numeral 68.

Because of the stripping means being carried at the end of the arm 61ª, it has been found in practice that the bar 61 tends to bind in the guideway 62. To overcome this, we secure to the bar 61 near its lower end an arm 66 extending in the opposite direction from the arm 61ª and to the end of this arm 66 we attach a counterweight 67.

The particular form of stripping means illustrated in Fig. 27 is shown more in detail in Figs. 9 and 10. Referring to these figures, it will be seen that this stripping means comprises upper and lower wheels 69 and 70, these wheels having hubs 71 and 72 journalled on a common axis on a pin 73 carried by the arm 61ª. The wheels are carried below the arm 61ª and disposed in closely adjacent parallel planes, the hubs being separated by a washer 71ª. It will be further noted that these wheels each comprise a plurality of substantially radial but somewhat curved spokes or fingers, the fingers of the two wheels being curved in opposite directions and being of such shape and length as to overlap each other vertically.

Referring again to Fig. 5, it will be seen that the upper end of the bar 61 is pivoted to the lower end of a connecting rod 74, the upper end of which is pivoted on a wrist pin set into a crank arm 75 rigidly secured to the end of a shaft 76 mounted in bearings 77. In line with the shaft 76 is a second shaft 78 supported in bearings 79, these bearings 77 and 79 resting on a base 80 which in turn is carried by a platform 81 supported by the crossbraces 14 shown in Figs. 1 and 2. Secured to the shaft 78 between the bearings 79 is a pulley 82 driven by a belt 83 from an electric motor 84. The whole mechanism is enclosed in a housing 85.

Secured to the inner end of the shaft 78 is a clutch disc 86, which may be held to the shaft as by means of a set screw 87, and a coupling member 137 may be secured to the outer end. Parallel with and spaced from the clutch disc 86 is a stationary brake disc 88 supported by means of an angle iron frame 89. This brake disc has an opening in its center, and through this opening passes a sleeve 90, having at its free end a disc 91 disposed between the two discs 86 and 88 and adapted to engage alternately with both of them. The sleeve 90 is slidably mounted on the shaft 76 as by means of a key 92. Surrounding the sleeve 90 is any suitable type of a combined rotary and thrust bearing comprising an inner race 93 secured to the sleeve as by means of a set screw 94, and an outer race 95. Radially projecting from this outer race 95 is a pin 96 to which is secured one end of a spring 97, the other end of this spring being anchored to a fixed support 98, preferably carried by the bearing 77.

Pivotally connected with the pin 96 is the upper end of a lever 99 pivoted near its middle at 100 to a fixed support and connected at its lower end to the core 101 of a solenoid 102.

A switch box 103 is secured to the fixed support 98 and contains a switch operated by arm 104, which may be of any suitable type. This arm is adapted to be engaged and actuated by a cam 105 secured to the shaft 76.

In the diagram, Fig. 28, the wires leading to the storage battery or other source of supply are shown at 107 and 108. In one or both of these wires is inserted a manual switch 109 for controlling the motors. The motor 84 is shown as connected across the wires 107 and 108, while the motors 44 and 44' are also connected across these wires by means of conductors 110.

A switch 111, which is preferably mounted in the switch box 106 (see Fig. 1), is provided with an actuating arm 112, preferably having a roller 113 at the end thereof. The Bowden wire 40 is connected with a bar 114 slidably mounted in brackets 116 and having at one end a coil spring 115 which holds the bar at its extreme position. Pivotally mounted on the bar 114 is a finger 117 adapted to engage the roller 113 and swing the arm 112 on its pivot in such a manner as to close the switch. A conductor 118 connects the positive wire 107 with the switch in box 103 (Fig. 5) operated by arm 104, and from this switch extends a conductor to one side of the solenoid 102. From the other side of this solenoid extends a wire 119 to one side of a relay 120, and from the other side of this relay extends a wire 121 to one side of the switch 111, the other side of which is connected by conductor 122 to the negative wire 108. The relay has an armature 124, connected to the wire 122 by means of a conductor 123, and the armature is adapted to engage a contact 125 connected with one side of the relay winding and with the wire 121.

To receive the tobacco leaves delivered rearwardly by the conveyors 41, a suitable trailer may be attached to the machine or, as shown in Fig. 1, a fabric bag or receptacle 126 may be hung from rods 127 secured to the frame 1 and so located that the leaves carried by the conveyor 41 are discharged into this bag or receptacle.

The operation of the machine, as so far described, is as follows. The machine is propelled along the rows of plants, the driving wheel 2 traveling between two rows, and the machine is so guided that the stalks in one row enter the slots $x$ and $y$ shown in Fig. 3. Similarly, the stalks of the other row will enter corresponding slots at the other side of the machine as indicated in broken lines. The present description however will be limited to the operation of the machine on the plants of a single row as illustrated in full lines at the right hand side of Fig. 2 and the left hand side of Fig. 3. The stripping means 68 is normally located in some such position as shown in Figs. 3, 8 and 22, in which position it lies in a substantially horizontal plane above the lower leaves of the plant.

Figures 7, 8:
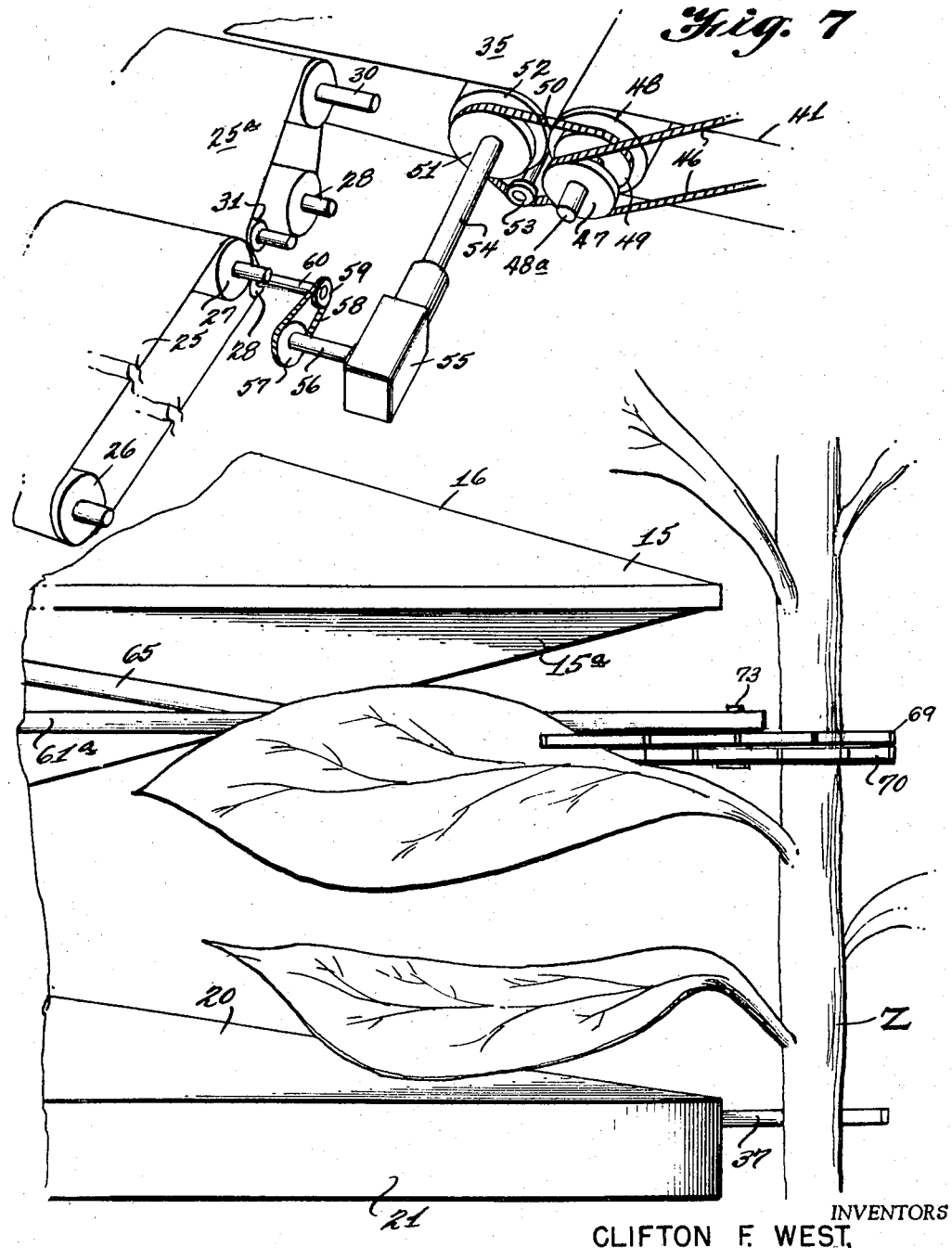
Fig. 7 is a diagrammatic fragmentary perspective view showing parts of one arrangement of our improved conveyer belts and the means for driving them.
Fig. 8 is a fragmentary side elevation on an enlarged scale showing our improved leaf guiding means, and the stripping means associated therewith and in engagement with a tobacco stalk.

As the machine moves along, the lowermost leaves ride up on the sloping plates 20 and are lifted into substantially horizontal position as shown in Fig. 8, while at the same time any leaves which tend to project up above the plane of the stripping means are guided downwardly by the sloping plate 15ª.

A tobacco stalk is shown at $z$ in Figs. 11 and 12. As above mentioned, the wheels 69 and 70 are freely and independently rotatable so that as the stripping means engages a stalk one or both wheels will be turned by the stalk as the machine moves along. If the stalk is so positioned as to enter between the spokes $a$ and $b$ of the wheel 69, as indicated in Fig. 11, it will engage the spoke $b$ and turn the wheel. The spoke $a$ then follows behind the stalk and at the next instant the stalk is enclosed between the spoke $a$ of the wheel 69 and the spoke $c$ of the wheel 70, form a horizontally disposed enclosure embracing the stalk, as illustrated in Fig. 12. In other words, at this instant the stalk is completely surrounded on all sides by the stripping device.

If, on the other hand, the stalk $z$ is located further to the left, as viewed in Fig. 11, it will engage the convex surface of the spoke $a$ and will thus turn the wheel 69 until the next adjacent spoke comes in behind the stalk, and, in cooperation with one of the spokes of the wheel 70, forms an enclosure completely surrounding the stalk. In other words, regardless of the position of the wheels 69 and 70 relative to each other, and regardless of the exact distance of the stalk from the center of the wheels, there will always be an instant at which a spoke of one wheel cooperates with a spoke of the other wheel to form an enclosure completely surrounding the stalk.

In Fig. 19 the trip arm 37 is shown in full lines in its normal position. As the machine travels along, and as each tobacco stalk becomes surrounded by a pair of spokes, as above described, the trip arm 37 will engage the stalk and be swung by it from the position shown in Fig. 19 to that shown in Fig. 20.

When the trip arm is thus swung on its pivot, it will exert a pull on the Bowden wire 40 as shown in Fig. 20, and this in turn will cause the bar 114 (Fig. 28) to slide forwardly and thus cause the finger 117 to engage and swing the switch arm 112 on its pivot. This closes the switch 111 and the relay 120 will thus be energized over the wires 119, 121 and 122. This moves the armature 124 into engagement with the contact 125, thus establishing a shunt around the switch 111, and maintaining the relay 120 energized through the conductor 123. Current then flows from the main 107 through wire 118, switch 104, solenoid 102, wire 119, relay 120, contact 125, armature 124, and wires 123 and 122, thus energizing the solenoid 102.

Figure 5:
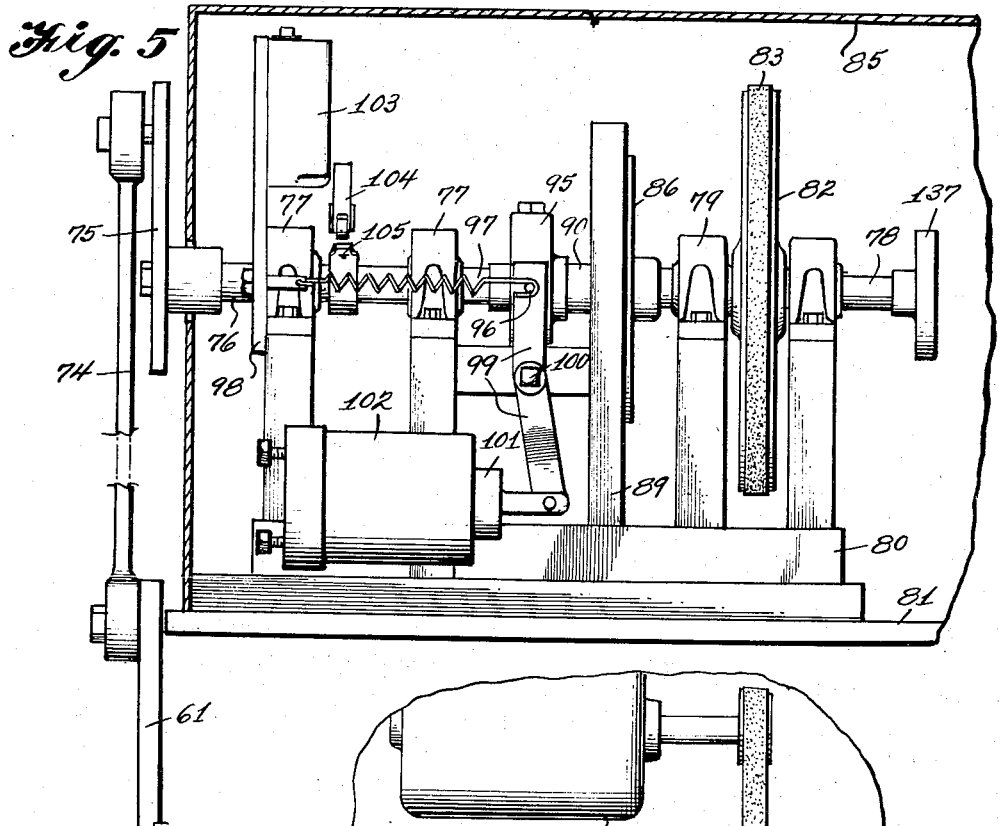
Fig. 5 is an enlarged side elevation showing a one-revolution clutch mechanism used for moving the stripping means illustrated in Figs. 9 to 13, 16 and 17 up and down, parts being shown in section.
Figure 6:
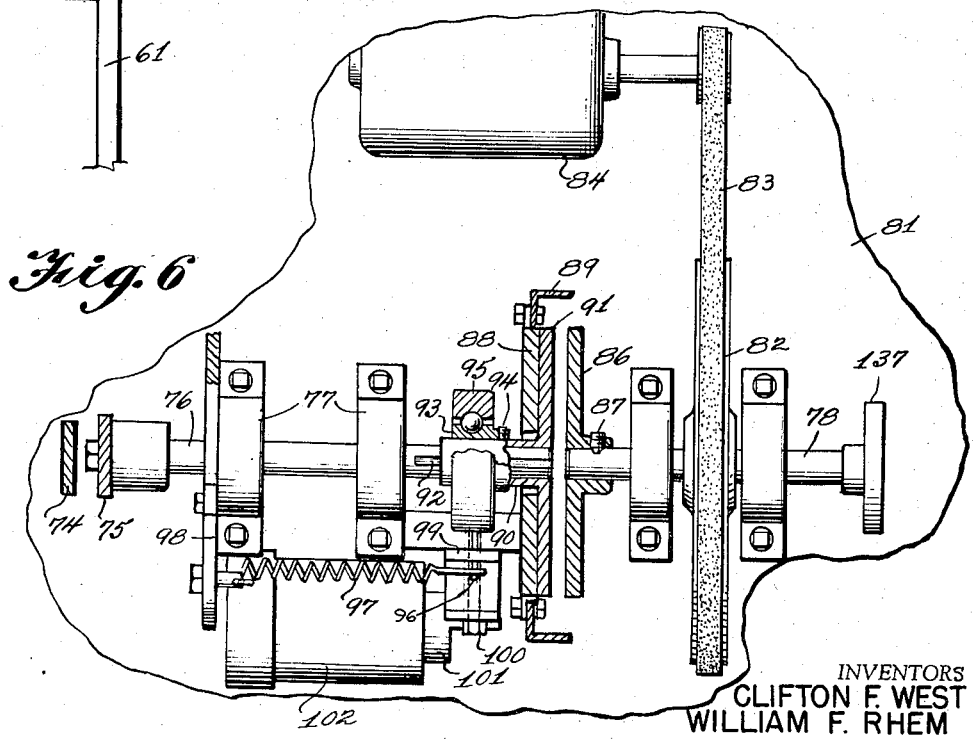
Fig. 6 is a plan view of the mechanism shown in Fig. 5, parts being broken away and parts being shown in section.

Meanwhile, the motor 84, shown in Fig. 6, drives the wheel 82 continuously, so that the clutch disc 86 is constantly driven. Energization of the solenoid 102 causes it to draw in its core 101 and swing the lever 99 on its pivot. This, acting through the bearing 95, moves the sleeve 90 and disc 91 toward the right, as viewed in Fig. 6 into frictional engagement with the clutch disc 86. The disc 91 which is keyed to the shaft 76 thus begins to turn. The normal position of the crank 75 is as shown in Fig. 5 so that when the shaft 76 turns this crank moves in such a manner as to thrust the connecting rod 74 and bar 61 suddenly downwardly. This moves the stripping wheels downwardly along the stalk as shown in Fig. 8, thus stripping from the stalk all of the leaves below the starting point of the wheels. The leaves so stripped fall upon the transversely moving conveyer 25 at each side of the row and are carried by these conveyers laterally to the longitudinally travelling conveyers 35. These conveyers deliver the leaves on to the conveyers 41 by which they are discharged from the rear of the machine.

The shaft 76 and crank 75 continue to revolve so that as soon as the stripping means has made its downward stroke, as before described, it is immediately moved upwardly again to its original starting point. In other words, the crank 75 at each actuation of the solenoid makes one complete revolution. As it reaches its original position the cam 105 on the shaft 76 trips the switch arm 104 and thus breaks the circuit of solenoid 102. When the solenoid is thus de-energized the spring 97 draws the disc 91 back into engagement with the fixed braking disc 88, thus stopping the shaft 76 in a position at which the crank 75 is at the top of its movement, as shown in Fig. 5, and the stripping means is at the uppermost limit of its stroke.

The mechanism above described thus constitutes a one-revolution clutch controlled by the solenoid 102 and interposed between the constantly running motor 84 and the crank 75, so that, upon energization of the solenoid, the crank makes one complete revolution and then stops, with all of the associated parts in their original position. When the stripping means is returned by the crank 75 to its starting point it is of course in a position to engage and operate on the next succeeding stalk. The hump or channel 16 in the plate 15 is for the purpose of accommodating the brace 65 at the upper end of its movement, as shown in Fig. 1.

The arrangement of the switch and relay shown in Fig. 28 is important. When the bar 114 slides forwardly, the finger 117 swings the switch arm 112, and immediately the finger slips off of the roller 103, thus releasing the switch arm. The momentary closing of the switch 111 energizes the relay 120 which thereupon maintains its own circuit and the circuit through the solenoid 102 until the switch 104 is tripped open by the cam 105 as above described. Thus it is immaterial how long the trip arm 37 remains in engagement with a stalk. The movement of this trip arm merely causes a momentary closure of the switch 111, which then snaps back to its original open position. By virtue of this arrangement, it will be seen that even if the machine should happen to stop with the trip arm 37 in the position shown in Fig. 12, no harm would be done, since the stripping means would make a single stroke only and then stop.

In Fig. 13 we have illustrated a modified arrangement in which the stripper wheels 69' and 70' are mounted on pivots spaced from each other longitudinally of the machine and carried by a cross bar $61^b$, secured to the arm $61^a$. The ends of this cross bar are slightly offset, upwardly and downwardly, as indicated at $61^d$, and the stripper wheels are pivotally mounted on these offset portions, both on the lower side of the bar. These wheels thus lie in closely adjacent, parallel planes and are of such size that the spokes overlap as shown. In this way, as the stripping means engages a stalk $z$ at least two of the arms of the wheels at some instant, and at that instant form an enclosure completely surrounding the stalk the trip arm 37 is actuated.

Figure 16:
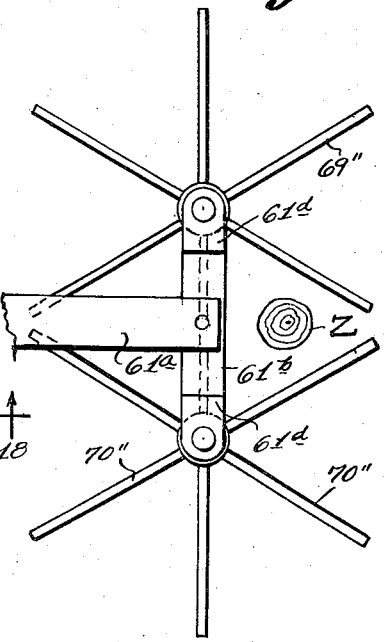

In Fig. 16 we have shown a similar arrangement except that the spokes of the wheels 69'' and 70'' are straight. Also, while in Figs. 9 to 13 we have shown each wheel as having eight spokes, in Fig. 16 we have illustrated each wheel as having only six spokes. The exact number of spokes may be varied as desired.

In Figs. 17 and 18, we have shown a further modified form of stripping means. In this form we provide a spider having radial arms 128 pivotally mounted at 129 on the lower side of the arm $61^a$, and on the lower side of the end of each arm of the spider is mounted for free rotation about a pivot 130 a stripping wheel. The arms 128 are vertically alternately offset on the hub, as shown in Fig. 18, so that the groups of alternate arms lie in different horizontal planes. Thus the stripping wheels $69^a$, $69^b$ and $69^c$, carried by one group of arms, and the stripping wheels $70^a$, $70^b$ and $70^c$, carried by the other group of arms, lie in closely adjacent parallel planes, and the spokes of the wheels are of such length as to overlap each other. When a stripping means of this type engages a stalk, both the wheels and the spider are rotated thereby, and the stalk becomes surrounded between the spokes of two adjacent wheels.

The various forms of stripping means so far described have been carried by a single arm $61^a$ mounted at one side only of the slots $x$ and $y$, as shown in Figs. 3 and 4.

Figure 15:
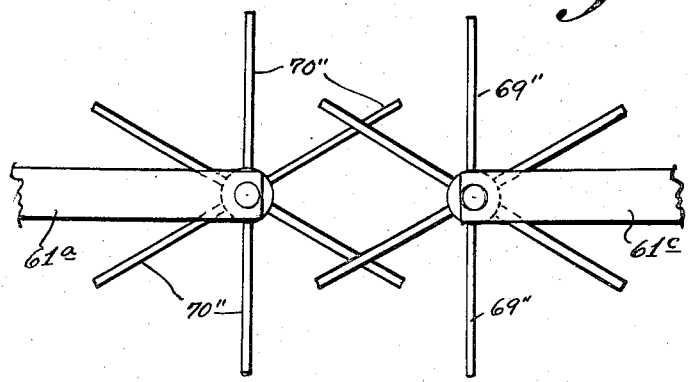

We also contemplate an arrangement, however, in which the two stripping wheels are mounted on opposite sides of these slots. Two forms of such an arrangement are shown in Figs. 14 and 15, and in these figures an additional arm $61^c$ is provided to support the wheel on the other side of the slot. Such an arrangement necessitates the use of the form of clutch mechanism illustrated in Fig. $5^a$.

Referring to this figure, it will be seen that instead of mounting the crank arm 75 on the shaft 76, as in Fig. 5, we mount a sprocket wheel on the end of this shaft and connect it by a sprocket chain 138 to a sprocket wheel 139 on a jack shaft 153 mounted in bearings 154 secured to the underside of the plate 81.

The crank arm 75 is mounted on this jack shaft 153, and is joined by means of a connecting rod 74 with the vertically sliding bar 61.

At the other end of the shaft 153 is mounted a similar crank arm 75' which is joined by a connecting rod 74' with a second vertically sliding bar 61'. Thus the two bars 61 and 61' operate the arms $61^a$ and $61^c$ shown in Figs. 14 and 15. The two bars 61 and 61' of course move simultaneously, both being driven by the shaft 153 which, in turn, is driven from the shaft 76 through the one-revolution clutch herein before described and clearly illustrated in Figs. 5 and 6.

In the description of the operation of the machine, particularly with reference to Fig. 8, it has been assumed that the stripping means was positioned at such a height as to remove from the stalk the lowermost leaves of the plant. However, as is well known, it is the common practice to remove the lowermost leaves, at the first priming operation, and subsequently to remove groups of leaves higher up on the stalk, as they ripen. To enable our machine to perform this function, we provide means for varying, as desired, the height of the stripping means from the ground. Although hydraulic or other means may be provided for this purpose, we have illustrated a simple arrangement consisting of a pair of large turnbuckles 132, disposed one at each side of the stripping mechanism. As best shown in Fig. 1, each of these turnbuckles comprises upper and lower threaded shanks 133 and 134, the upper shank being pivotally connected at 135 to a vertical plate or bracket 131 supported on the machine frame. The lower shank 134 is pivotally connected at 136 to the frame 63. Thus, when the body 132 of the turnbuckle is turned, the frame 63, carrying the rods 13, plates 15 and 18 and associated parts, and the platform 85 with the one-revolution clutch mechanism, is raised relative to the machine frame. In other words, all of the parts shown in Fig. 8 may be raised as required, so as to set the stripping means at any desired distance from the ground. This stripping means, having been set to any selected height, is caused to move downward by the crank 75 (Fig. 5) through a predetermined distance, and then returned to its starting point. This distance through which the stripping means moves may be set to include any desired portion of the stalk, that is to say, the lowermost portion, the middle portion or the upper portion.

When the stripping means is set to engage the upper portion of the stalk there is a tendency for the stripping means to bend or break the stalk, since the upper portion is more or less flexible and flimsy. A feature of our invention comprises means for supporting the stalk, under these conditions, so as to prevent it from being bent or broken.

The supporting means is illustrated in Figs. 24, 25 and 26 and consists of a plate 140 conforming in general to the shape of and adapted to be bolted to the pan or plate 18 or 18' beneath the conveyers. The plate 140 comprises a portion 140ª which conforms substantially with the shape of the plates 20 or 20' in Fig. 4. Underneath the plate 140 is a marginal strip 141 to strengthen it and to form a mounting for a plurality of sprocket wheels 142, around which passes a sprocket chain 143. A series of fingers 144 are secured to and project horizontally and outwardly from this chain, one run of the chain being substantially parallel with the slot y, and the fingers extending out across this slot. Referring to Fig. 26, the strip 141 is secured to the plate 140 by means of bolts 145, on which the sprocket wheels are mounted, and the plate 140 is secured to the pan or plate 18' by bolts 146. It will be understood that this means for supporting the stalks is applied to the pan only when the stripping means is elevated to a position to operate on the upper portions of the stalks.

The sprockets 142 are driven through suitable gearing 148, 149 by means of a flexible shaft 150 geared as indicated at 151 to a special ground wheel 152, preferably mounted at the rear of the machine near its center in a manner similar to the ground wheels 3. The reason for driving the sprocket chain 143 and fingers 144 from a ground wheel, such as 152, is because of the necessity for securing a definite speed relation relative to the ground. The gearing 148, 149 and 151 is so designed that the speed of travel of the chain 143 and the fingers 144 is exactly the same as the speed of travel of the machine over the ground. It will of course be understood that the series of fingers moves rearwardly along the slot, and since they move rearwardly at the same speed at which the machine travels forwardly it is obvious that the fingers are in effect stationary with respect to the tobacco stalks. Thus, when a stalk is received between two such fingers, the fingers remain in engagement with it during the time that the stripping mechanism operates, and as the machine moves forward the fingers are gradually disengaged from the stalk as the chain 143 passes around the sprockets 142.

In Figs. 29 to 35 we have illustrated a modified construction of mechanism which differs substantially from that previously described, and which has certain advantages as hereinafter pointed out.

In the first place, the transversely moving conveyor belt 25 passes directly around rollers 26 and 155 at the outer and inner edges thereof, respectively, instead of passing around the plurality of rollers 27 to 31, inclusive, shown in Figs. 7 and 21. This is rendered possible by so mounting the conveyor belt 25 that it is disposed slightly above the longitudinal conveyor 35, as clearly shown in Fig. 34, and consequently the upwardly inclined portion 25ª, shown in Fig. 21, is not needed.

Furthermore, a different method of driving this conveyor belt is illustrated in Figs. 29 and 34. In these figures, the forward end of the roller 155 is driven by means of a flexible shaft 156 extending from such forward end, in between the runs of the belt back to the rear end where it is connected with sprocket 57, driven by chain 46, as before.

In order to tension the belt 25, the ends of the rollers 26 and 155 are preferably mounted in members 26ª and 155ª, these members being secured to the frame by bolts passing through slots as shown in Fig. 29 so that they may be adjusted longitudinally.

Referring to Fig. 34, it will be seen that a plate 18'' is provided beneath the belt 25 and that the bottom pan 157 is preferably inclined upwardly as shown. Furthermore, a roller 36ª is preferably provided near the middle of the belt 35 to support the lower run thereof.

Referring to Fig. 29, it will be seen that the roller 36, around which the belt 35 passes, is mounted in bearings carried by rods 36ª having at their ends nuts 36ᵇ, so that the belt 35 may be tightened as required.

Secured to the main frame are a pair of sockets 158, in which the rods 13 are adjustably secured. As will hereinafter appear, the motor and clutch mechanism is not carried at the upper ends of these rods as in Fig. 1, but this mechanism is located much lower down in the machine, closely adjacent to the stripping device. The rods 13 pass freely up through sleeves on the main frame, as before, but these rods and sleeves serve only to guide the stripping mechanism as it is raised and lowered.

The main frame of the modified mechanism comprises a diagonal bar 159 at the rear end and a horizontal bar 160 at the front end. At the inner end of the bar 160 is a vertically extending member 161 and at the top of this a horizontally extending bar 162. At the other end there is a horizontally extending bar 163 to which the upper end of the diagonal bar 159 is welded. On this supporting frame rests a pair of truss members 166 and 167, each of said members being of substantially inverted U-shape as shown in Fig. 31 and having horizontal end portions 164 and 165 and a horizontal middle portion 166. A diagonally extending flat bar 168 also rests on the supports 162 and 163 between the trusses 166 and 167, as shown in Fig. 29.

As illustrated in Fig. 31, the turnbuckle 134 for raising and lowering the stripping mechanism, as in Fig. 1, may be attached directly to one or both of the truss members 166 and 167.

Extending across and supported on the truss members 166 and 167 are a pair of bars 169 and 170, shown as inverted channels, and secured to the lefthand side of these bars and rising vertically from the truss members are supporting members 171 and 172. Resting on these bars 169 and 170, at one side of the machine, are columns 174 and 175 supporting a cross bar 176, and at the other side of the machine are columns 178 and 179 supporting cross bars 180 and 181. As viewed in Fig. 33, there is another column 173 rising vertically from the bar 169 and supporting another inverted channel 182. At the righthand side of the machine, as viewed in Fig. 31, is a column 177 matching the column 172. On these inverted channels 180, 181, 182 and 176 are supported four bearings 183 in which are journalled a pair of alined shafts 184 and 185, similar to the shafts 76 and 78 shown in Fig. 6. These shafts carry a one-revolution clutch mechanism similar to that shown in Figs. 5 and 6, which mechanism is controlled by means of a solenoid 102 as before. Because this mechanism is similar to that shown in Figs. 5 and 6, it has not been deemed necessary to illustrate it in detail in Figs. 29 and 32.

On the shaft 184 is mounted a pulley 186 which is constantly driven by a belt 187 passing around a pulley 180 mounted on the shaft of an electric motor 189, which is the same as the motor 84 shown in Fig. 6. This motor 189 is mounted on a plate 190 supported on the truss members 166 and 167.

As best shown in Fig. 35, the solenoid operates a crank arm 99 pivoted at 100 to a fixed support and rigidly connected with an angle-shaped member having arms 191 and 192. A pin 96 is set into the arm 191 and also into the thrust bearing 95, as before, and a spring 97 is secured at one end to the pin 96 and at the other end to a fixed support.

At its free end the arm 192 is connected with one end of a spring 193, the other end of which is attached to a lug secured to a lever 194 pivoted at 195 to the fixed support 171. Near the opposite end of this lever is another lug 196 to which one end of a third spring 197 is attached, the other end of the spring 197 being secured to a fixed support. Secured, as by welding, to the upper end of the lever 194 is a cylinder 198 in which is enclosed a compression spring 199, and, in the end of the cylinder is slidably mounted a plunger 200, the same being secured by means of a screw 201 passing through a slot 202. Thus the plunger 200 is resiliently supported and urged outwardly by the spring 199.

When in the full line position shown in Figs. 29 and 35, the plunger 200 registers with and is arranged to engage an abutment 203 carried at the upper end of a crank arm 204, secured to shaft 185. When the solenoid 102 is energized and the lever 191, 192 swung on its pivot, the clutch is engaged as in Figs. 5 and 6, and the shaft 185 is driven. At the same instant, the lever 191, 192, acting through the spring 193, swings the lever 194 to the right as viewed in Fig. 35, or to the left as viewed in Fig. 32, thus shifting the cylinder 198 and plunger 200 into the position shown in dotted lines in Fig. 35, in which position it is out of line with the abutment 203. This leaves this abutment and the crank arm 204 free to turn, and the crank arm begins to revolve. When the cam 105 actuates the switch arm 104 to operate the switch 103 and de-energizes the solenoid, as before described, the spring 97, which is stronger than the spring 193, moves the angle lever 191, 192 so as to relax tension on the spring 193. At the same time, the spring 197 swings the lever 194 about its pivot back to full line position where it is stopped by the projection 171a, and where it is in the path of movement of the abutment 203. This abutment therefore impinges against the plunger 200 which constitutes a stop element for arresting the crank arm in the exact position from which it started. Thus, our improved mechanism provides means for accurately arresting the movement of the crank arm in identically the same position after it has made each single revolution. This is an advantage because, owing to the momentum of the parts, the clutch and brake mechanism previously described might not be effective to accurately stop the crank arm in exactly the desired position.

Pivoted to the crank arm as at 206 is a connecting rod 205, the lower end of which is secured to a plate 207 which supports one end of an arm 208, similar to the arm 61a in the previous figures, and carrying at its outer end the stripping wheels 68.

This arm 208 is circular in cross section and is mounted in a bearing 209 at the lower end of the connecting rod 205.

A link bar 210 is journalled at its upper end 211 on the arm 208, as most clearly shown in Fig. 33, and is integral with a bracket 212 which is offset laterally and which is journalled at 213 on the arm 208.

The lower end of the link bar 210 is secured to a shaft 214 journalled in bearings 215. These bearings are adjustably mounted in slots 216 formed in supporting members 217. Thus, by loosening the bolts holding the bearings to these members, the bearings and the shaft 214 may be vertically adjusted as desired.

A spring 218 is anchored at one end to the link bar 210 and at the other end to a supporting bolt 219 extending through the diagonal frame member 168 as best shown in Fig. 31.

Rigid with the link bar 210 adjacent its lower end is an offset bracket 220 having at its free end a sleeve 221 which is capable of fitting over the shaft 214. Thus, either the lower end of the link bar 210 or the lower end of the bracket 220 may be connected to the shaft 214 as desired, thus slightly changing the position of the arc in which the link bar swings.

A rod 222 is pivoted at its lower end to a bracket 223 adjustably secured in a slot 224 between the member 217 and a similar parallel member 225. Thus, the pivot point of the rod 222 may also be vertically adjusted as desired. This rod is preferably provided with a turnbuckle 226 intermediate its ends, so that its length may be adjusted. The upper end of the rod 222 is pivoted to an arm 227 extending radially from a collar 228 rigidly secured to the arm 208 as by means of a set screw.

The operation of this mechanism shown in Figs. 29 to 33 is as follows. As the crank arm 204 revolves in a counter-clockwise direction, as viewed in Fig. 31, the connecting rod 205 moves the arm 208 up and down, and with it the stripping wheels 68. Since this arm 208 is connected by the link bar 210 with the shaft 214, it is constrained thereby to move in a somewhat arcuate path as indicated by broken lines in Fig. 31.

If the arm 208 were rigid with the link bar 210 as it swings, the stripping wheels would be more or less tilted from side to side. In other words, they would not remain strictly horizontal. However, with the arm rotatably connected to the link bar 210, and with the rod 222 pivotally connected at its upper end to a bracket rigid with the arm, this rod serves to rock the arm 208 on its axis as it swings up and down with the link bar 210, thus preventing angular displacement of the arm 208 and maintaining the stripping wheels in substantially horizontal position at all times.

It will be seen that by employing the swinging link bar, as described, the necessity for a vertically sliding bar such as shown at 61 in Fig. 1 is obviated and a smoother operation results. It will be understood that, where in the claims we refer to the stripping means moving vertically, we intend of course to include the arrangement shown in Fig. 31 in which it moves in a vertical plane but in a slightly arcuate path.

What we claim is:

1. A machine for stripping tobacco leaves off the stalks of rows of plants standing in the field, comprising a wheeled frame adapted to travel along a row, vertically movable means carried by said frame for stripping from each successive stalk, as said frame moves along, all leaves below a definite height from the ground, and endless conveyer means carried by said frame for receiving and carrying away the loose leaves thus stripped off, said endless conveyor means comprising a transversely moving conveyor positioned on each side of the row to receive the leaves, and a longitudinally moving conveyor positioned laterally of each transversely moving conveyor onto which the transversely moving conveyor delivers the leaves which it receives.

2. A machine for stripping tobacco leaves off the stalks of rows of plants standing in the field, comprising a wheeled frame adapted to travel along a row, vertically movable stripping means carried by said frame constructed to engage each successive stalk, and remove therefrom as said frame moves along, all leaves below a definite height from the ground, and generally horizontal vertically spaced upper and lower guide means rigid with said frame for vertically guiding the leaves, said stripping means operating between said guide means.

3. A machine for stripping leaves from tobacco stalks standing in the field, comprising a mobile frame, movable stripping means mounted on said frame, said stripping means forming, when in leaf stripping position, a substantially horizontally disposed enclosure completely surrounding the stalk, means on said frame for moving all parts of said stripping means as a unit vertically, and control means on said frame operatively connected with said moving means, and arranged to be engaged by a tobacco stalk to cause downward movement of said stripping means.

4. A machine for stripping leaves from tobacco stalks standing in the field, comprising a mobile frame, movable stripping means mounted on said frame, said stripping means forming, when in leaf stripping position, a substantially horizontally disposed enclosure completely surrounding the stalk, means on said frame for moving said stripping means vertically, control means on said frame operatively connected to said moving means and adapted, when contacted by a tobacco stalk, to cause downward movement of said stripping means to remove all leaves from said stalk below a definite height from the ground, and conveyor means carried by said frame on each side of and below said stripping means for catching the leaves so removed.

5. A machine for stripping leaves from tobacco stalks standing in the field, comprising a mobile frame, movable stripping means mounted on said frame, said stripping means forming, when in leaf stripping position, a substantially horizontally disposed enclosure completely surrounding the stalk, means on said frame for moving said entire stripping means as a unit first downwardly a predetermined distance and then immediately upwardly to its starting point, thus removing from the stalk all leaves below a definite height from the ground, and restoring said stripping means to its original position, and control means on said frame operatively connected to said moving means and adapted to be actuated by contact with a tobacco stalk.

6. A machine for stripping leaves from tobacco stalks standing in the field, comprising a mobile frame, movable stripping means mounted on said frame, said stripping means forming, when in leaf stripping position, a substantially horizontally disposed enclosure completely surrounding the stalk, means on said frame for moving said entire stripping means as a unit first downwardly a predetermined distance from its normal position and immediately upwardly to its starting point, thus removing from the stalk all leaves below a definite height from the ground, control means on said frame operatively connected to said moving means, and means also on said frame for varying as desired the height from the ground of the normal position of said stripping means.

7. A machine according to claim 3 in which the stripping means includes freely rotatable wheels each consisting of a hub having spokes extending substantially radially therefrom, said wheels lying in separate, closely adjacent horizontal planes with the spokes of one wheel overlapping those of another.

8. A machine according to claim 3 in which the stripping means includes a pair of similar wheels mounted for free rotation about a common axis, and lying in separate, closely adjacent horizontal planes, each wheel consisting of a hub having curved spokes extending therefrom.

9. A machine according to claim 3 in which the stripping means includes a pair of similar wheels mounted to freely rotate about a pair of axes spaced apart longitudinally of the machine and lying in separate, closely adjacent horizontal planes, each wheel consisting of a hub having spokes extending substantially radially therefrom, the spokes of each wheel being of such length relative to the spacing of the wheels that they overlap.

10. A machine according to claim 3 in which the stripping means includes a pair of similar wheels mounted to freely rotate about a pair of axes spaced apart transversely of the machine, one on each side of the row, and lying in separate, closely adjacent horizontal planes, each wheel consisting of a hub having spokes extending substantially radially therefrom, the spokes of each wheel being of such length relative to the spacing of the wheels that they overlap.

11. A machine according to claim 3 in which the stripping means includes freely rotatable wheels each consisting of a hub having spokes extending substantially radially therefrom, a freely rotatable horizontal spider having arms on each of which one of said wheels is rotatably mounted, alternate wheels being mounted on opposite sides of said spider, and the spokes of each wheel overlapping those of adjacent wheels.

12. A machine for stripping tobacco leaves off the stalks of rows of plants standing in the field, comprising a wheeled frame adapted to travel along a row, stripping means carried by said frame, said stripping means forming, when in leaf stripping position, a substantially horizontally disposed enclosure completely surrounding each successive stalk, as said frame moves along, means mounted on said frame for moving said stripping means downwardly so as to cause it to remove from each stalk all leaves below a definite height from the ground, and means mounted on said frame for laterally supporting each stalk at the time it is surrounded by said stripping means so as to prevent it from being bent over by the vertical movement thereof.

13. A machine according to claim 12 in which the means for laterally supporting each stalk comprises a series of horizontally extending spaced fingers aranged to straddle the stalk, and means for moving said series of fingers rearwardly in a substantially horizontal plane at the same speed as that at which the machine travels forwardly, so that said fingers remain stationary relative to each stalk as it is engaged by said stripping means.

14. A machine according to claim 12 in which the means for laterally supporting each stalk comprises an endless chain carrying a series of spaced lateral projections, one run of said chain being disposed adjacent and substantially parallel with the row, and means for driving said chain in such manner that said run moves rearwardly in a substantially horizontal plane at the same speed as that at which the machine travels forwardly, so that said projections remain stationary relative to the stalks as the latter are successively surrounded by said stripping means.

References Cited in the file of this patent

UNITED STATES PATENTS

| | | |
|---|---|---|
| 1,646,594 | Phelps et al. | Oct. 25, 1927 |
| 2,435,334 | Wurtele | Feb. 3, 1948 |
| 2,524,151 | West | Oct. 3, 1950 |
| 2,696,069 | Hawkins | Dec. 7, 1954 |